United States Patent
Nakazawa et al.

Patent Number: 6,012,659
Date of Patent: Jan. 11, 2000

[54] METHOD FOR DISCRIMINATING BETWEEN USED AND UNUSED GAS GENERATORS FOR AIR BAGS DURING CAR SCRAPPING PROCESS

[75] Inventors: Yuji Nakazawa; Mitsuhiko Fukabori, both of Hyogo; Yusaburo Nakazato, Gunma; Osamu Fujimoto, Aichi; Yutaka Kondo, Aichi; Masahiro Miyaji, Aichi, all of Japan

[73] Assignees: Daicel Chemical Industries, Ltd., Osaka; Toyota Jidosha KabushikiKaisha, Aichi, both of Japan

[21] Appl. No.: 08/913,318
[22] PCT Filed: Jun. 14, 1996
[86] PCT No.: PCT/JP96/01644
   § 371 Date: Sep. 12, 1997
   § 102(e) Date: Sep. 12, 1997
[87] PCT Pub. No.: WO97/00144
   PCT Pub. Date: Jan. 3, 1997

[30] Foreign Application Priority Data

Jun. 16, 1995 [JP] Japan ................ 7-150463

[51] Int. Cl.⁷ ............... B02C 19/00; B02C 23/08
[52] U.S. Cl. .............. 241/24.1; 241/24.13; 241/27; 241/DIG. 38
[58] Field of Search ............... 241/24.1, 24.12, 241/24.13, 24.25, 27, 30, DIG. 38

[56] References Cited

U.S. PATENT DOCUMENTS

| | | | |
|---|---|---|---|
| 4,504,019 | 3/1985 | Newell et al. | 241/73 |
| 5,294,244 | 3/1994 | Allerton, III et al. | 75/401 |
| 5,431,350 | 7/1995 | Purser | 241/101.72 |
| 5,752,716 | 5/1998 | Fukawatase et al. | 280/741 |
| 5,849,062 | 12/1998 | Fukabori et al. | 75/10.65 |

FOREIGN PATENT DOCUMENTS

| | | |
|---|---|---|
| 0 747270 A2 | 12/1996 | European Pat. Off. . |
| A-5213149 | 8/1993 | Japan . |
| A-7277131 | 10/1995 | Japan . |
| A-8132015 | 5/1996 | Japan . |

*Primary Examiner*—John M. Husar

[57] ABSTRACT

To provide a method for easily discriminating used and unused gas generators from among gas generators for air bags separated from used cars in a car scrapping process. A method for discriminating between used and unused gas generators according to the present invention is a method for discriminating used and unused gas generators from among gas generators for air bags separated from used cars in a car scrapping process, and this method comprises the steps of:

a) crushing used cars mounted with gas generators each having on a surface thereof a material discoloring according to the surface temperatures in actuating the gas generator to separate the gas generators, and b) discriminating the gas generators in which surfaces are discolored and the gas generators in which surfaces are not discolored from among the separated gas generators.

6 Claims, 2 Drawing Sheets

METHOD FOR DISCRIMINATING BETWEEN USED AND UNUSED GAS GENERATORS FOR AIR BAGS DURING CAR SCRAPPING PROCESS

FIELD OF THE INVENTION

The present invention relates to a method for discriminating between used and unused gas generators for air bags, which protect passengers from shock, more specifically to a method for discriminating used and unused gas generators from among gas generators for air bags separated from used cars in a car scrapping process.

DESCRIPTION OF THE RELATED ART

An air bag unit(s) is installed in a vehicle for a purpose of protecting passengers from an impact caused by a collision. This air bag unit comprises an air bag to be expanded by gas at the time of a collision to form a cushion between a passenger and a steering wheel or seat, and a gas generator to feed gas into this air bag.

The gas generator comprises a housing made of metallic material, a gas generating agent disposed in this housing Ignition means is actuated by the impact, and this causes the gas generating agent to burn to generate high temperature and high pressure gas.

A member for forming the housing of the gas generator is made of, form example, aluminum or stainless steel. The gas generating agent includes, for example, $NaN_3$ (sodium azide), $CuO$ (copper monoxide) and the like as a principal component. In addition to the above, parts such as a filter comprising a stainless metal mesh, stainless wool, and ceramic, etc., and a coolant are contained in the gas generator.

In a car scrapping process, gas generators are separated from used cars, and the separated gas generators are charged into a melting furnace to recover the metal materials of the gas generators.

In order to do so, used and unused gas generators are generally discriminated from among gas generators separated from used cars to throw the used gas generators into a melting furnace.

In order to take out a gas generator from an air bag unit installed in a used car, it has been carried out by manual operation according to the following procedures: detaching an air bag unit from a steering wheel; disassembling the detached air bag apparatus in the order of an air bag cover, an air bag, a gas generator, and a steering wheel adaptor; and, then, recovering the gas generator.

In the case of used air bag units, they can readily be distinguished since the air bags are unfolded and deployed out of the air bag covers, but when the gas generators are separated alone from scrapped cars, it is difficult to know if the gas generators are unused or used.

In the preceding conventional method for recovering a gas generator by manual operation, there are problems that the recovering efficiency is very low and the recovering cost becomes high as well because of the facts that first of all, a used car, in which an air bag unit(s) is installed, has to be found out among used cars, those having and not having air bag unit(s), and that labor and time are required as described above in order to recover the gas generator from the used car found.

In the case of used air bag units, combustion of the gas generating agents is accompanied with adhesion of the combustion residue thereof onto the filter. In addition, burning is caused on the housing of the gas generator by combustion heat, and it is considered to make distinction based on this.

However, when used cars are treated by a crushing means to separate gas generators, fine crushed pieces are adhered to the filters and the housings, and this provides the risk that the combustion residues on the filters and the burning on the housing are covered with the crushed pieces to make the distinction impossible.

Accordingly, an object of the present invention is to provide a method for easily discriminating used and unused gas generators from among gas generators for air bags separated from used cars in a car scrapping process.

SUMMARY OF THE INVENTION

A method for discriminating between used and unused gas generators according to the present invention is a method for discriminating used and unused gas generators from among gas generators for air bags separated from used cars in a car scrapping process, and this method comprises the steps of:
  a) crushing used cars mounted with gas generators each having, on a surface thereof, a material discoloring according to the surface temperatures in actuating the gas generators to separate the gas generators, and
  b) discriminating the gas generators, in which surfaces are discolored, and the gas generators, in which surfaces are not discolored, from among the separated gas generators.

In other words, the above method is a method for discriminating between used and unused gas generators in a process for scrapping cars mounted with gas generators, each having, on a surface thereof, a material discoloring according to the surface temperatures in actuating the gas generators, comprising the steps of:
  a) crushing used cars to separate used or unused gas generators for air bags from the used cars, and
  b) discriminating the gas generators, in which surfaces are discolored, and the gas generators, in which surfaces are not discolored, from among the separated gas generators. The gas generators having surfaces, which discolor in the form of characters, patterns or marks are preferred, and the gas generators discoloring in character-, pattern- or mark-shaped grooves formed on the surfaces thereof can be utilized. Discoloration is preferably irreversible. Materials discoloring at 150° C. or higher or 200° C. or higher can preferably be used.

The surfaces thereof can discolor in the form of characters, patterns or marks. Accordingly, more certain discrimination and selection are possible.

Further, the surfaces can discolor in the character-, pattern- or mark-shaped grooves formed on the surfaces.

The materials discoloring according to the surface temperatures in operating the gas generators include those constituted in a sheet form or those constituted in a paint form, and the sheet-shaped material can be adhered to or the paint-shaped material can be applied onto the-surface of the gas generator.

The used cars mounted with the gas generators can be treated by a crushing means to separate the gas generators.

That is, when crushing used cars equipped with air bag units, crushed pieces have almost the same average size as those of the gas generators since the gas generators are strong, and in such case, the gas generators themselves are not crushed and separated from the other parts of the air bag units.

In the simple gas generators separated from the other parts of the air bag units, the used ones discolor on surfaces thereof and therefore can quite obviously be distinguished as well by unskilled workers.

Further, character-, pattern- or mark-shaped grooves can be formed on the surfaces of the gas generators to apply a paint-shaped material in these grooves. Since the paint-shaped material is applied in the grooves, the gas generators can more certainly be discriminated even when the surfaces are damaged after the gas generators pass through crushing means.

DETAILED DESCRIPTION OF THE INVENTION

EXAMPLES

The examples of the present invention will be explained below.

Figure 1:
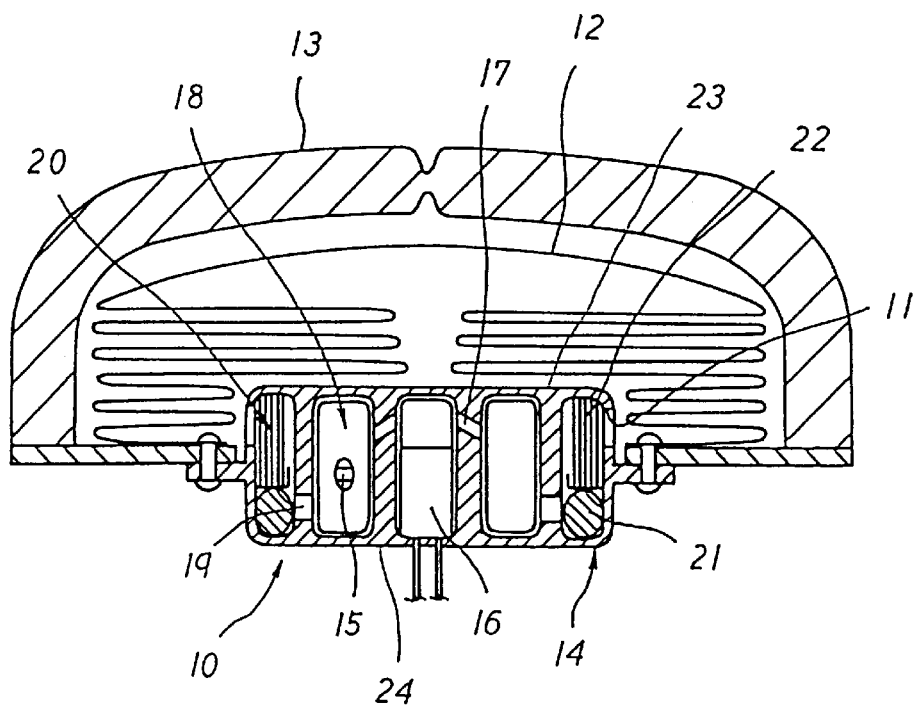
FIG. 1 is a cross section of an air bag unit used for the embodiment of the present invention.

FIG. 1 shows one example of an air bag unit mounted on a used car. This air bag unit comprises a gas generator 10 generating gas in shock, an air bag 12 which is installed in this gas generator 10 in a folding state and expanded by introducing gas from an exhaust port 11, and an air bag cover 13 wholly covering this air bag 12.

The gas generator 10 comprises a housing 14 having an exhaust port 11, a gas generating agent 15 disposed in a combustion chamber 18 provided in this housing 14, and ignition means for igniting this gas generating agent 15, that is, a squib enhancer 16, in which a squib (igniter) and an enhancer (inflammation) are integrated.

When a sensor (not shown) detects shock, a signal thereof is sent to the squib to actuate the squib, and the enhancer is ignited by this to generate high pressure and high temperature flame. This flame gets into the combustion chamber 18 through a through hole 17 to ignite the gas generating agent 15 disposed therein. This combusts the gas generating agent 15 to produce gas. The combustion gas is spurted into a coolant filter chamber 20 from an aperture 19 and cooled down while passing through a coolant 21 and a filter 22. Thus, the combustion residue is removed, and cooled and cleaned gas flows into an air bag 12 via the gas exhaust port 11. This causes the air bag 12 to break the air bag cover 13 and expand to form a cushion, to thereby protect the passenger from the shock.

This gas generator is applied with a paint on an upper face 23 and/or a lower face 24 of the housing 14. This paint comprises a material that discolors according to the surface temperatures of the housing upon the actuation of the gas generator. This paint is applied on the surface of the housing in such an area as readily distinguishable by workers.

An ink is used for the material that discolors according to the surface temperatures and can be printed on the surface of the gas generator. In this case, the printed part is preferably covered with a protective film. The surface of the ink is strengthened by covering with the protective film, and the ink face can be prevented from peeling off by breakage caused by vibration during the transportation of the gas generator.

Figure 2:
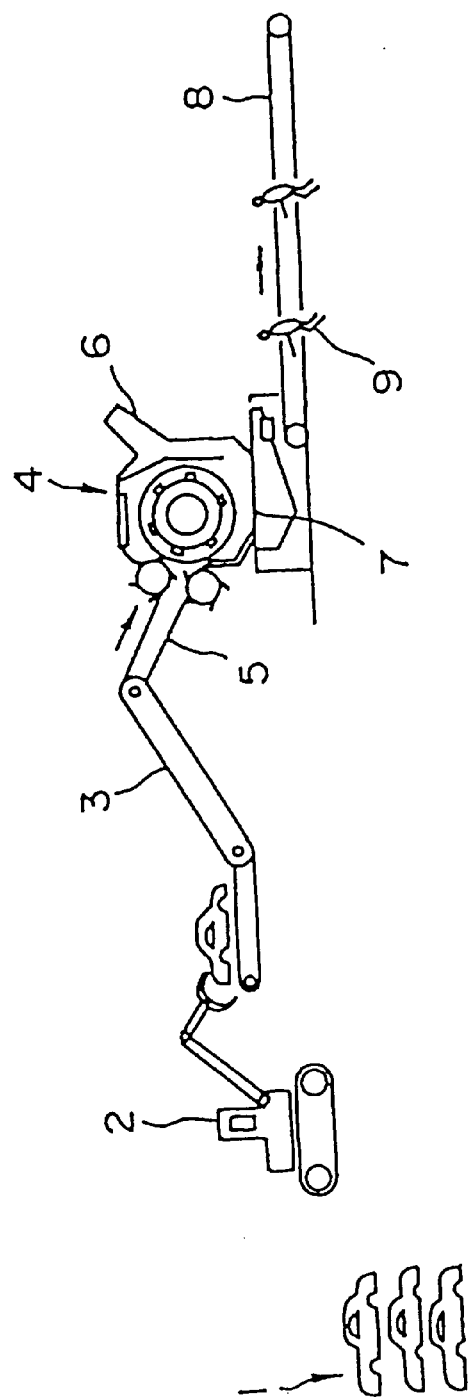
FIG. 2 is a structural diagram of a crushing means and a related apparatus thereof used for the embodiment of the present invention.

FIG. 2 shows a constitutional diagram of crushing means and a related apparatus thereof. Used cars 1, from which useful parts such as batteries, tires, and the like have been removed, are piled up. Cars mounted with no air bag units may be among these used cars. These used cars can be pressed in advance. The used car 1 is put on a feed conveyor 3 by a loader 2 and sent to crushing means, that is, a shredder 4. This shredder 4 is adjusted so that the crushed pieces have almost the same average size as those of the gas generators. The used car 1 is charged into the shredder from a charging port 5 of the shredder and crushed therein. Out of the crushed pieces, the light pieces such as plastics are blown up from an upper exhaust port 6 and sent to an unillustrated cyclone and the like to be recovered as dusts. Further, the heavy matters are discharged from a lower exhaust port 7 and put on a belt conveyor 8 to be transported outside. The simple gas generators separated from the air bag units detached from the used cars by the shredder 4 are contained in the pieces on the belt conveyor 8. A worker 9 simply recovers the gas generators along the belt conveyor 8.

The worker 9 can readily discriminate those having discolored surfaces, that is, the used gas generators, and those having undiscolored surfaces, that is, the unused gas generators from among the gas generators with naked eyes.

The separately discriminated used and unused gas generators each are sent to the next steps.

In order to recover metal materials, the used gas generators can be sent to a step for charging them into a melting furnace.

Further, in order to actuate the unused gas generators, they can be sent to a heating step. The unused gas generators can be charged into, for example, a heating furnace to actuate the gas generators by heating.

Example 1

A material that discolors according to temperatures, that is, a heat sensitive paint was applied onto the surface of a gas generator, and the gas generator was actuated to measurer the temperatures of the surface thereof. Further, the state of discoloration was checked, and the following results were obtained.

i) Conditions a) Gas generators for a driver seat manufactured by Daicel Chemical Ind. Co., Ltd.

DEC500000, DEB500001 and DMG520000 - - - each two sets b) Heat sensitive paint

[Thermo Bell] NF-130, NF-160, NF-200, and NF-270 each manufactured by Netsuken Chemical Ind. Co., Ltd.

c) Thermo couple

φ0.3 AC ii) Embodying Method

1) Thermo couples are adhered to two positions, which are apart from the center of the bottom face of the gas generator by half of the radius.

2) Four kinds of [Thermo Bell] described above are applied wholly on the faces obtained by dividing equally the upper face, the side faces, and the bottom face of the gas generator into four portions respectively.

3) One of each two sets of the gas generators is put in a bath having a temperature of −40° C., and the other is put in a bath having a temperature of +85° C. After the prescribed temperatures are reached, the gas generators are taken out of the respective baths and put separately into tanks. The gas generators are actuated in the tanks to measure the surface temperatures and check the results of discoloration.

iii) Results

The discoloration results of four kinds of [Thermo Bell] described above are shown in Table 1.

TABLE 1

|  | DEC500000 | | DEB500001 | | DMG520000 | |
| --- | --- | --- | --- | --- | --- | --- |
|  | L | H | L | H | L | H |
| NF-130 | ◉ | ◉ | ◉ | ◉ | ◉ | ◉ |
| NF-160 | ◉ | ◉ | ◉ | ◉ | ◉ | ◉ |
| NF-200 | ◉ | ◉ | ◉ | ◉ | ○ | ◉ |
| NF-270 | — | ○ | ◉ | ◉ | — | ○ |
| Thermo couple max. temp. (° C.) | 212 204 | 259 182 | 298 290 | 377 356 | 179 176 | 223 218 |

L=−40° C., H=+85° C., ◉=discolored,
≃=not discolored, ○=intermediate

The thermo couple maximum temperature of 182° C. in Table 1 is considered due to the detachment of the thermo couple.

Example 2

Next, the used and unused gas generators were charged into the shredder, and the state of the heat sensitive paint in the shredder was checked to obtain the following results.

I. Unused Gas Generator i) Conditions
   a) Gas generator
      DEB500001 dummy (that is, not charged with a gas generating agent, a squib, and an enhancer)
   b) Heat sensitive paint
      [Thermo Bell] NF-130, NF-160, NF-200, and NF-270 each manufactured by Netsuken Chemical Ind. Co., Ltd.

According to the explanation of the product catalogue, the numerals show standard temperatures (° C.) at which colors change.

ii) Embodying Method
1) Four kinds of [Thermo Bell] described above are applied on the whole faces of the upper face and the bottom face of the gas generator.
2) The gas generator described above is put in a used car and charged into a shredder manufactured by Tissen Henschell Co., Ltd. (Germany).
3) It is checked how the heat sensitive paints change in the shredder.

iii) Results
1) NF-130 discolors from purple to light purple; NF-160 discolors from blue to light blue; and NF-200 and NF-270 do not change.
2) No marked color change was observed in any of the heat sensitive paints.
3) An increase in the temperatures in the shredder shall be 130° C. or lower.

II. Used Gas Generator i) Conditions
   Gas generators
   Used are each two sets of the used gas generators DEC500000, DEB500001, and DMG520000 which were actuated in Example 1 described above.

ii) Embodying Method
1) The gas generators described above are put in used cars and charged into the shredder manufactured by Tissen Henschell Co., Ltd. (Germany).
2) It is checked how the heat sensitive paints change in the shredder.

iii) Results
1) DEC500000 (L, H)
   NF-130 discolors from blue to Light blue
   NF-160 remains black to which it has been discolored by actuation
   NF-200 comes back to the original paint color
   NF-270 remains discolored by actuation
2) DEB500001 (L, H)
   NF-130 is the same as in DEC500000 (L, H)
   NF-160 and NF-200 are the same as in DEC500000 (L, H)
   NF-270 remains black purple to which it has been discolored by actuation
3) DMG520000 (L, H)
   Same as in DEC500000 (L, H).

Summarized are the results of I described above in Table 2 and the results of II described above in Table 3. In the tables, "before" means before charging into the shredder, and "after" means after charging into the shredder. Further, "→" represents the same as in the left.

TABLE 2

| | | (unused gas generators) | | | | | | | |
| --- | --- | --- | --- | --- | --- | --- | --- | --- | --- |
| | | NGF-130 | | NGF-160 | | NGF-200 | | NGF-270 | |
| | | Before | After | Before | After | Before | After | Before | After |
| DEC 500000 | L | Purple purple | Light | Blue | Light blue | Yellow-orange | → | Brown | → |
| | H | Purple purple | Light | Blue | Light blue | Yellow-orange | → | Brown | → |
| DEB 500001 | L | Purple purple | Light | Blue | Light blue | Yellow-orange | → | Brown | → |
| | H | Purple purple | Light | Blue | Light blue | Yellow-orange | → | Brown | → |
| DMG 520000 | L | Purple purple | Light | Blue | Light blue | Yellow-orange | → | Brown | → |
| | H | Purple purple | Light | Blue | Light blue | Yellow-orange | → | Brown | → |

With respect to the paint of NF-130, the coated film becomes thin by shredding, and purple looks light purple.

With respect to the paint of NF-160, the coated film becomes thin by shredding, and blue looks light blue.

TABLE 3

| | | NGF-130 | | NGF-160 | | NGF-200 | | NGF-270 | |
|---|---|---|---|---|---|---|---|---|---|
| | | Before | After | Before | After | Before | After | Before | After |
| DEC 500000 | L | Blue | Light blue | Black | Black | Blackish yellow orange | Yellow-orange | Brown | → |
| | H | Blue | Light blue | Black | Black | Blackish yellow orange | Yellow-orange | Light black brown | → |
| DEB 500001 | L | Blue | Light blue | Black | Black | Blackish yellow orange | Yellow-orange | Black purple | → |
| | H | Blue | Light blue | Black | Black | Blackish yellow orange | Yellow-orange | Black purple | → |
| DMG 520000 | L | Blue | Light blue | Black | Black | Blackish yellow orange | Yellow-orange | Black purple | → |
| | H | Blue | Light blue | Black | Black | Blackish yellow orange | Yellow-orange | Light black brown | → |

With respect to the paint of NF-130, the coated film becomes thin by shredding, and blue looks light blue.

With respect to the paint of NF-200, the coated film becomes thin by shredding, and blackish yellow orange comes back to the original color of yellow orange.

The factors of paints having preferred discrimination include (1) distinct color change according to a change in temperatures on the surface of a gas generator in actuating, (2) no color change caused by a shredder and (3) no color change as well caused by the maximum value of environmental temperatures (for example, 85° C.). Considering the three factors described above, NF-130 and NF-160 are preferred. Considering that paints having a color change at higher temperatures than the environmental temperatures are more stable, NF-160 is more preferred.

The present invention is constituted as explained above, and therefore anybody can readily discriminate between used and unused gas generators separated from used cars in a car scrapping process.

Accordingly, a lot of used and unused gas generators can efficiently be discriminated separately according to the present invention.

Further, the present invention removes a detaching work of gas generators from used cars by a troublesome and time-consuming manual work and makes it possible to separate a lot of gas generators at a high efficiency and a low cost.

We claim:

1. A method for discriminating between used and unused gas generators in a process for scrapping cars mounted with gas generators each having on a surface thereof, a material that discolors according to the surface temperatures in actuating the gas generators, comprising:

a) crushing the used cars to separate used or unused gas generators for air bags from the cars; and b) discriminating the gas generators, in which surfaces are discolored, and the gas generators, in which surfaces are not discolored, from among the separated gas generators.

2. The method as claimed in claim 1, wherein the gas generators have surfaces, which discolor in the form of characters, patterns, or marks.

3. The method as claimed in claim 1, wherein the gas generators discolor in character-, pattern- or mark-shaped grooves formed on the surfaces thereof.

4. The method as claimed in claim 1, wherein said material discolors irreversibly.

5. The method as claimed in claim 1, wherein said material discolors at the temperature of 150° C. or higher.

6. The method as claimed in claim 1, wherein said material discolors at the temperature of 200° C. or higher.

* * * * *